(12) United States Patent
Nanjo et al.

(10) Patent No.: US 11,208,189 B2
(45) Date of Patent: Dec. 28, 2021

(54) OUTBOARD MOTOR AND MARINE VESSEL

(71) Applicant: YAMAHA HATSUDOKI KABUSHIKI KAISHA, Iwata (JP)

(72) Inventors: Morihiko Nanjo, Shizuoka (JP); Akihiro Onoue, Shizuoka (JP); Satoru Hamada, Shizuoka (JP); Kimitaka Saruwatari, Shizuoka (JP); Yuki Ikegaya, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 16/997,985

(22) Filed: Aug. 20, 2020

(65) Prior Publication Data

US 2021/0061432 A1 Mar. 4, 2021

(30) Foreign Application Priority Data

Aug. 27, 2019 (JP) .............................. JP2019-154358

(51) Int. Cl.
*B63H 20/14* (2006.01)
*B63H 21/14* (2006.01)
*B63H 21/17* (2006.01)
*B63H 23/34* (2006.01)

(52) U.S. Cl.
CPC ............. *B63H 20/14* (2013.01); *B63H 21/14* (2013.01); *B63H 21/17* (2013.01); *B63H 23/34* (2013.01)

(58) Field of Classification Search
CPC ........ B63H 20/14; B63H 21/14; B63H 21/17; B63H 23/24
See application file for complete search history.

(56) References Cited

U.S. PATENT DOCUMENTS

| 1,903,350 | A | * | 4/1933 | Landrum | B63H 23/04 440/75 |
| 2,145,623 | A | * | 1/1939 | Hill | F16C 33/22 440/75 |
| 3,025,822 | A | | 3/1962 | Tenney | |
| 3,487,803 | A | * | 1/1970 | Alexander, Jr. | B63H 21/28 440/75 |
| 5,302,147 | A | | 4/1994 | Oishi | |
| 6,966,806 | B1 | * | 11/2005 | Bruestle | B63H 20/34 440/76 |
| 2008/0146095 | A1 | | 6/2008 | Fukuoka et al. | |
| 2017/0349256 | A1 | | 12/2017 | Nakamura | |

FOREIGN PATENT DOCUMENTS

| DE | 2 224 626 A1 | 12/1972 |
| JP | 05-85483 A | 4/1993 |
| JP | 11-268689 A | 10/1999 |
| JP | 2017-052326 A | 3/2017 |

OTHER PUBLICATIONS

Official Communication issued in corresponding European Patent Application No. 20189154.6 dated Jan. 21, 2021.

* cited by examiner

*Primary Examiner* — Stephen P Avila
(74) *Attorney, Agent, or Firm* — Keating and Bennett, LLP (57) ABSTRACT

An outboard motor includes an engine, a propeller shaft that rotates together with a propeller and extends in a forward-rearward direction, and a lower case that houses the propeller shaft. The lower case includes a front case and a rear case separate from the front case and positioned rearward of the front case, and the front case and the rear case are assembled to each other.

20 Claims, 5 Drawing Sheets

FIG.2
FIRST PREFERRED EMBODIMENT

FIG.5
REVERSE DRIVE STATE (ENGINE DRIVE STATE)

FIG.6
MOTOR DRIVE STATE (NEUTRAL STATE)

FIG.7
SECOND PREFERRED EMBODIMENT

OUTBOARD MOTOR AND MARINE VESSEL

CROSS REFERENCE TO RELATED APPLICATIONS

This application claims the benefit of priority to Japanese Patent Application No. 2019-154358 filed on Aug. 27, 2019. The entire contents of this application are hereby incorporated herein by reference.

BACKGROUND OF THE INVENTION

1. Field of the Invention

The present invention relates to an outboard motor including a lower case that houses a propeller shaft and a marine vessel.

2. Description of the Related Art

An outboard motor including a lower case that houses a propeller shaft is known in general. Such an outboard motor is disclosed in Japanese Patent Laid-Open No. 11-268689, for example.

Japanese Patent Laid-Open No. 11-268689 discloses an outboard motor including a propeller shaft and a gear housing (lower case) that houses the propeller shaft. The gear housing (lower case) is configured by assembling an upper housing and a lower housing disposed below the upper housing with each other. A split surface between the upper housing and the lower housing extends in a horizontal direction along the central axis of the propeller shaft. In the outboard motor, various internal components such as the propeller shaft and a bevel gear unit are assembled to the gear housing (lower case) in a state in which the upper housing and the lower housing of the gear housing (lower case) are separated in an upward-downward direction.

However, in the outboard motor disclosed in Japanese Patent Laid-Open No. 11-268689, the split surface of the gear housing (lower case) extends in the horizontal direction along the central axis of the propeller shaft, and thus when the assembly accuracy of the upper housing and the lower housing and the machining accuracy of the upper housing and the lower housing are not sufficiently secured, a step or misalignment is likely to occur on the entire split surface between the upper housing and the lower housing along the central axis of the propeller shaft. Consequently, when the various internal components such as the propeller shaft and the bevel gear unit are assembled to the gear housing (lower case), it may be time-consuming to enhance the accuracy of the axial centers of bearings that support the propeller shaft (accurately install the bearings such that the central axes of the bearings are aligned with the central axis of the propeller shaft).

SUMMARY OF THE INVENTION

Preferred embodiments of the present invention provide outboard motors and marine vessels in each of which, bearings that support propeller shafts are easily and accurately installed in lower cases, and the lower cases are divided such that the workability of assembling internal components including the propeller shafts is improved.

An outboard motor according to a preferred embodiment of the present invention includes an engine, a propeller shaft that rotates together with a propeller and extends in a forward-rearward direction of the outboard motor, and a lower case that houses the propeller shaft. The lower case includes a front case and a rear case separate from the front case and positioned rearward of the front case, and the front case and the rear case are assembled to each other.

In an outboard motor according to a preferred embodiment of the present invention, the lower case includes the front case and the rear case separate from the front case and disposed rearward of the front case, and the front case and the rear case are assembled to each other. Accordingly, unlike the conventional outboard motor in which the split surface extends in the forward-rearward direction over the entire lower case, in an outboard motor according to a preferred embodiment of the present invention, the split surface between the front case and the rear case extends in the forward-rearward direction only in a portion of the lower case. Therefore, unlike the conventional outboard motor, the split surface (a portion in which a step or misalignment is likely to occur) is spaced apart from positions at which bearings of the propeller shaft are installed in the lower case. That is, the bearings are easily and accurately installed in the lower case without being affected by the assembly accuracy of the front case and the rear case on the split surface and the machining accuracy of the split surface between the front case and the rear case. Furthermore, the lower case is divided into the front case and the rear case, and thus internal components including the propeller shaft are assembled also from the split surface such that the workability of assembling the internal components including the propeller shaft is improved. As described above, the bearings that support the propeller shaft are easily and accurately installed in the lower case, and the lower case is divided such that the workability of assembling the internal components including the propeller shaft is improved. In addition, the lower case is divided into the front case and the rear case such that a tool such as a drill contacts the lower case from the split surface side (the side of the surface exposed for the first time by dividing), and a water passage and an oil passage, for example, are provided in the lower case by machining. That is, the mechanical workability of the lower case is improved.

In an outboard motor according to a preferred embodiment of the present invention, a split surface between the front case and the rear case preferably extends in a direction perpendicular or substantially perpendicular to the forward-rearward direction. Accordingly, in an outboard motor according to a preferred embodiment of the present invention, the split surface between the front case and the rear case is provided only in a very small area of the lower case in the forward-rearward direction, and thus the split surface is more easily spaced apart from the positions at which the bearings of the propeller shaft are installed as compared with a case in which the split surface is largely inclined so as to extend along the forward-rearward direction. Consequently, the bearings are more accurately installed in the lower case.

An outboard motor according to a preferred embodiment of the present invention preferably further includes a drive shaft to transmit a driving force of the engine to the propeller shaft, and a split surface between the front case and the rear case is preferably positioned forward of the drive shaft. Accordingly, the split surface is spaced forward from the position of a gear unit installed at the lower end of the drive shaft in the forward-rearward direction, and thus the gear unit is accurately installed in the lower case.

In such a case, an outboard motor according to a preferred embodiment of the present invention preferably further includes a shift shaft to switch a shift state of the outboard motor, and the split surface is preferably positioned forward of the shift shaft. Accordingly, the split surface is spaced forward from the position of a slider installed at the lower end of the shift shaft in the forward-rearward direction, and thus the shift shaft is accurately installed in the lower case.

In an outboard motor according to a preferred embodiment of the present invention, a split surface between the front case and the rear case is preferably positioned forward of a front end of the propeller shaft. Accordingly, the split surface is spaced forward from the propeller shaft in the forward-rearward direction, and thus the propeller shaft is accurately installed in the lower case.

In an outboard motor according to a preferred embodiment of the present invention, the lower case preferably includes an internal space chamber that includes an open rear portion to house the propeller shaft and extends in the forward-rearward direction along a central axis of the propeller shaft, and a split surface between the front case and the rear case is preferably positioned forward of the internal space chamber. Accordingly, various components housed in the internal space chamber are accurately installed in the lower case.

In such a case, an outboard motor according to a preferred embodiment of the present invention preferably further includes an electric motor disposed on an extension of the central axis of the propeller shaft to rotate the propeller instead of the engine, the lower case preferably includes a motor chamber disposed adjacent to a front portion of the internal space chamber to house the electric motor, and the split surface is preferably disposed at a position at which the motor chamber is divided. Accordingly, the electric motor is housed in the motor chamber from the split surface, and thus the electric motor is easily installed in the lower case.

An outboard motor including the lower case including the motor chamber preferably further includes a water pump to pump cooling water, the front case preferably includes a water passage through which the cooling water pumped by the water pump flows, the outboard motor preferably further includes wiring connected to the electric motor via the water passage, the lower case preferably includes a wiring chamber that houses an end of the wiring connected to the electric motor, communicates with the motor chamber, and is watertight, and the split surface and the wiring chamber are preferably spaced apart from each other in the forward-rearward direction. Accordingly, a structure (for example, a seal) that enhances the watertightness of the wiring chamber and a structure (for example, a seal) that enhances the watertightness of the split surface are separately spaced apart without intersecting with each other, and thus complex shapes of the seals due to crossing of the structures are prevented.

An outboard motor including the lower case including the internal space chamber preferably further includes an electric motor disposed on an extension of the central axis of the propeller shaft to rotate the propeller instead of the engine, and a motor driving force transmission disposed between the electric motor and the propeller shaft to transmit a driving force of the electric motor to the propeller shaft, and the split surface is preferably disposed forward of the motor driving force transmission and at a position corresponding to the electric motor. Accordingly, the split surface is positioned forward of the motor driving force transmission including a plurality of gears and having a relatively complex shape, and the electric motor is easily installed in the lower case from the split surface.

An outboard motor including the lower case including the internal space chamber preferably further includes a water pump driven by the propeller shaft to pump cooling water, the lower case preferably includes a pump housing chamber disposed adjacent to a front portion of the internal space chamber to house the water pump, and the split surface is preferably disposed at a position at which the pump housing chamber is divided. Accordingly, the water pump is housed in the pump housing chamber from the split surface, and thus the water pump is easily installed in the lower case.

An outboard motor according to a preferred embodiment of the present invention preferably further includes a water pump to pump cooling water, the front case preferably includes a water passage through which the cooling water pumped by the water pump flows, and at least a portion of the water passage provided in the front case is preferably disposed on a split surface between the front case and the rear case. Accordingly, the water passage, for example, is provided by inserting a drill or the like into the front case from the split surface. That is, the mechanical workability of the front case is improved.

In such a case, the lower case preferably includes a streamlined torpedo-shaped portion, the front case preferably includes an intake port disposed in a vicinity of a tip of the torpedo-shaped portion and through which cooling water that flows into the water passage is taken in, and the water passage preferably includes an inclined water passage inclined with respect to an upward-downward direction of the outboard motor. Accordingly, even the inclined water passage, which is difficult to mold with a die and is inclined with respect to the upward-downward direction, is easily provided by machining performed by bringing a tool such as a drill into contact with the lower case from the split surface side (the side of the surface exposed for the first time by dividing) after molding with a die.

In an outboard motor according to a preferred embodiment of the present invention, the lower case preferably includes a streamlined torpedo-shaped portion, and the front case and the rear case are preferably assembled to each other with a plurality of first fasteners disposed at an interval on an outer peripheral portion of the torpedo-shaped portion. Accordingly, the first fasteners are disposed in a balanced manner on the outer peripheral portion of the torpedo-shaped portion, and thus the torpedo-shaped portion is reliably kept watertight.

In such a case, an outboard motor according to a preferred embodiment of the present invention preferably further includes an upper portion connected to the torpedo-shaped portion from above and which is thin in a right-left direction of the outboard motor (i.e., thinner than the torpedo-shaped portion in the right-left direction), and the front case and the rear case are preferably assembled to each other with second fasteners respectively provided in a vicinity of an intermediate position of the upper portion of the lower case and in a vicinity of an upper end of the upper portion of the lower case in the upward-downward direction. Accordingly, the second fasteners are disposed in the upper portion in a balanced manner in the upward-downward direction, and thus the entire split surface (the torpedo-shaped portion and the upper portion) is reliably kept watertight.

An outboard motor according to a preferred embodiment of the present invention preferably further includes an upper case including a single member assembled to the front case and the rear case from above. Accordingly, the front case and the rear case are assembled to the same upper case, and thus the mutual positional accuracy of the front case and the rear case is improved as compared with a case in which the front case and the rear case are assembled to different structures.

In such a case, the lower case preferably includes a streamlined torpedo-shaped portion, and a split surface between the front case and the rear case preferably extends over an entire area between an upper end of the lower case that contacts the upper case and a lower end of the torpedo-shaped portion. Accordingly, as compared with the conventional outboard motor in which the split surface extends in a horizontal direction along the central axis of the propeller shaft, the split surface is provided in a wider area in the upward-downward direction, and thus the mechanical workability of the upper portion of the lower case is improved.

A marine vessel according to a preferred embodiment of the present invention includes a hull and an outboard motor mounted on the hull, and the outboard motor includes an engine, a propeller shaft that rotates together with a propeller and extends in a forward-rearward direction, and a lower case that houses the propeller shaft, the lower case includes a front case and a rear case separate from the front case and disposed rearward of the front case, and the front case and the rear case are assembled to each other.

In a marine vessel according to a preferred embodiment of the present invention, with the structure described above, bearings that support the propeller shaft are easily and accurately installed in the lower case, and the lower case is divided such that the workability of assembling internal components including the propeller shaft is improved, similarly to the outboard motors according to preferred embodiments of the present invention described above.

In a marine vessel according to a preferred embodiment of the present invention, a split surface between the front case and the rear case preferably extends in a direction perpendicular or substantially perpendicular to the forward-rearward direction. Accordingly, in an outboard motor of a marine vessel according to a preferred embodiment of the present invention, the split surface between the front case and the rear case is provided only in a very small area of the lower case in the forward-rearward direction, and thus the split surface is more easily spaced apart from positions at which the bearings of the propeller shaft are installed as compared with a case in which the split surface is largely inclined so as to extend along the forward-rearward direction. Consequently, the bearings are more accurately installed in the lower case.

A marine vessel according to a preferred embodiment of the present invention preferably further includes a drive shaft to transmit a driving force of the engine to the propeller shaft, and a split surface between the front case and the rear case is preferably positioned forward of the drive shaft. Accordingly, the split surface is spaced forward from the position of a gear unit installed at the lower end of the drive shaft in the forward-rearward direction, and thus the gear unit is accurately installed in the lower case.

In such a case, the outboard motor preferably further includes a shift shaft to switch a shift state of the outboard motor, and the split surface is preferably positioned forward of the shift shaft. Accordingly, the split surface is spaced forward from the position of a slider installed at the lower end of the shift shaft in the forward-rearward direction, and thus the shift shaft is accurately installed in the lower case.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

First Preferred Embodiment

The structure of a marine vessel 101 and an outboard motor 100 according to a first preferred embodiment of the present invention is now described with reference to FIGS. 1 to 6.

Figure 1:
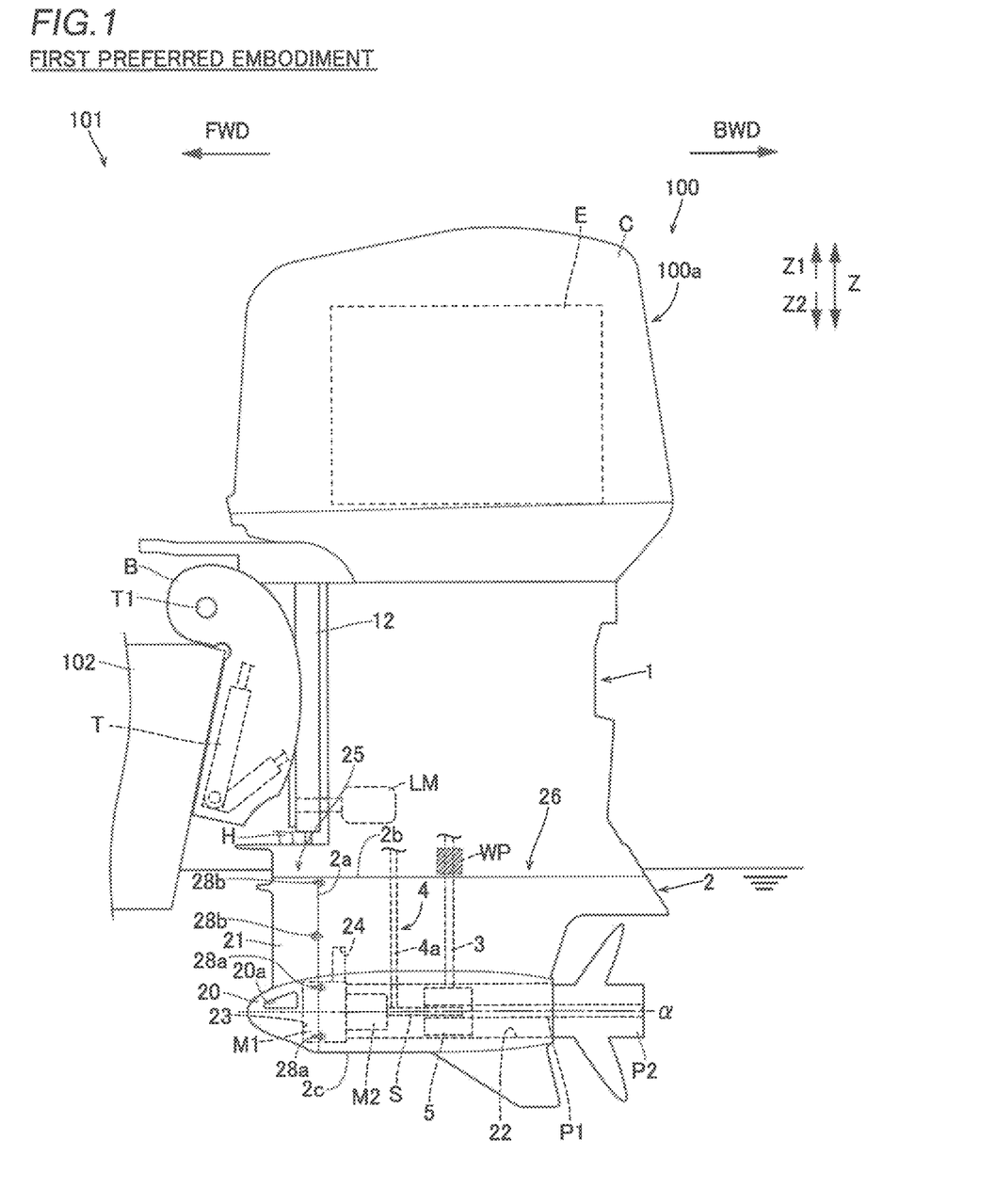
FIG. 1 is a side view schematically showing the overall structure of an outboard motor according to a first preferred embodiment of the present invention.

As shown in FIG. 1, the marine vessel 101 includes a hull 102 and the outboard motor 100 attached to a portion (rear portion) of the hull 102 in a BWD direction.

In the following description, the term "front (forward)" refers to the forward movement direction (a direction indicated by "FWD" in the figures) of the marine vessel 101, and the term "rear (rearward)" refers to a direction indicated by "BWD" in the figures. Furthermore, a "forward-rearward direction" refers to the forward-rearward direction of the marine vessel 101 (outboard motor 100) and a direction (a direction along the central axis α of a propeller shaft P1) parallel to the propeller shaft P1, for example. An "upward-downward direction" refers to the trim-tilt direction of the outboard motor 100, an "upward direction" refers to an "arrow Z1 direction", and a "downward direction" refers to an "arrow Z2 direction". A "right-left direction" refers to a direction perpendicular to the upward-downward direction and a direction perpendicular to the forward-rearward direction. A "horizontal direction" refers to a direction along a horizontal plane perpendicular to the upward-downward direction and a steering direction.

The outboard motor 100 includes a bracket B that fixes the outboard motor 100 to the hull 102, a trim-tilt device T provided on the bracket B, and lower mounts LM and upper mounts (not shown) provided on the bracket B.

The trim-tilt device T includes a cylinder, and rotates an outboard motor body 100a in the trim-tilt direction about a tilt shaft T1 that extends in the right-left direction by expanding and contracting the cylinder.

The lower mounts LM support a lower portion of the outboard motor body 100a (upper case 1) from the front side. The lower mounts LM are disposed in a lower portion of the upper case 1 in the upward-downward direction. The outboard motor body 100a in this description refers to an entire structure supported by the lower mounts LM and the upper mounts.

The outboard motor 100 (outboard motor body 100a) further includes an engine E, an electric motor M1, the propeller shaft P1, a propeller P2, a motor driving force transmission M2, a cowling C, the upper case 1, a lower case 2, a drive shaft 3, a switch 4 including a shift shaft 4a, and a bevel gear unit 5.

The outboard motor 100 has three types of drive states. Specifically, the outboard motor 100 has three types of drive states including a "forward drive state" in which the propeller P2 is rotated by the driving force of the engine E to move the marine vessel 101 forward, a "reverse drive state" in which the propeller P2 is rotated by the driving force of the engine E to move the marine vessel 101 rearward, and a "motor drive state" in which the propeller P2 is rotated by the driving force of the electric motor M1 to move the marine vessel 101 (forward or rearward). The three types of drive states of the outboard motor 100 are switched by the switch 4.

Figure 2:
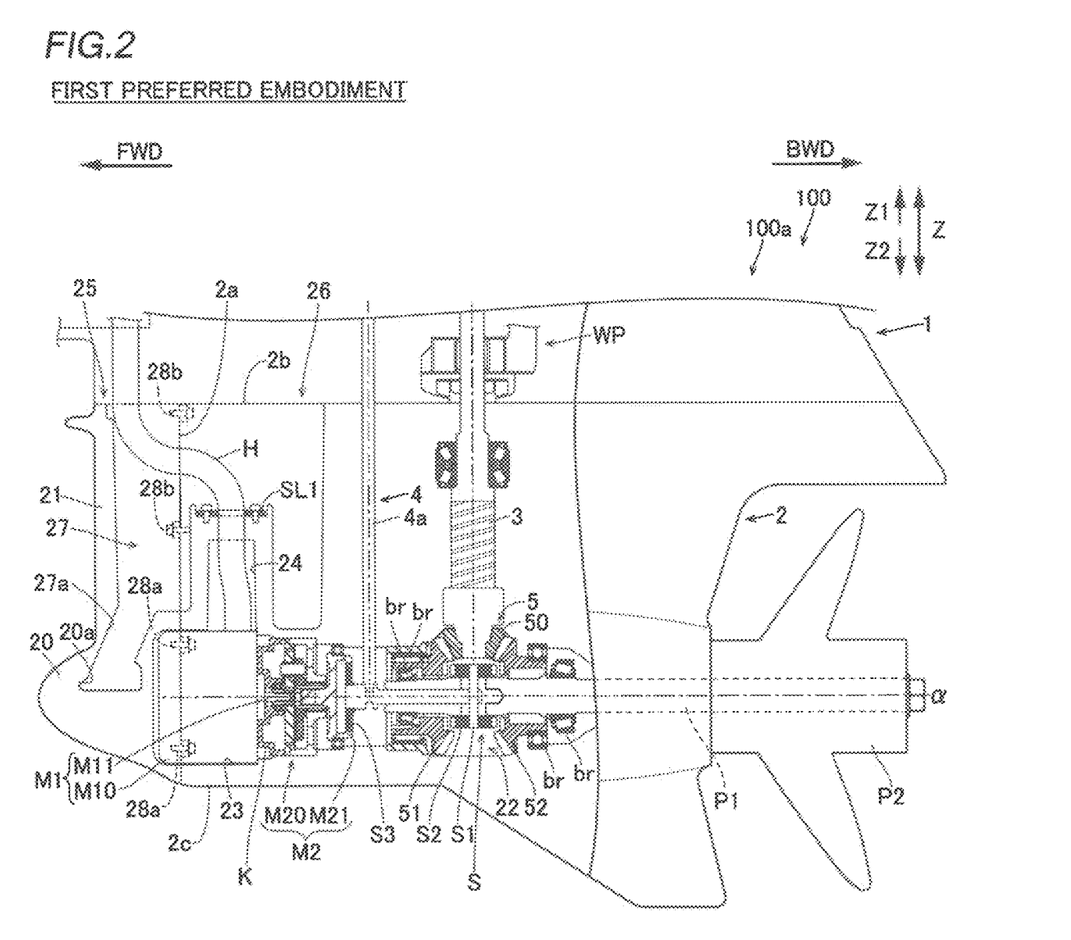
FIG. 2 is a partial sectional view showing the structure of the outboard motor according to the first preferred embodiment of the present invention.

The lower case 2 according to the first preferred embodiment includes two members including a front case 25 and a rear case 26 separate from the front case 25.

The rear case 26 is disposed rearward of the front case 25. The lower case 2 is configured by assembling the two members including the front case 25 and the rear case 26 with each other. The details are described below. The structure of each portion of the outboard motor 100 is now described.

The engine E is an internal combustion engine that generates a driving force by combustion of fuel. The engine E is disposed in the uppermost portion of the outboard motor body 100a. The engine E is connected to the upper end of the drive shaft 3 that extends in the upward-downward direction, and rotates the drive shaft 3 by the generated driving force (torque). Consequently, the engine E rotates the propeller P2 together with the propeller shaft P1.

The electric motor M1 shown in FIG. 2 rotates the propeller P2 instead of the engine E (see FIG. 1). Wiring H through which electric power is supplied to the electric motor M1 is connected to the electric motor M1.

The wiring H is connected to the electric motor M1 via a water passage 27 provided in the lower case 2 (the front case 25 and the rear case 26). The end of the wiring H connected to the electric motor M1 is positioned in a wiring chamber 24 provided in the lower case 2 (rear case 26).

Cooling water (water to cool each portion of the outboard motor 100) pumped by a water pump WP flows through the water passage 27. The water pump WP is preferably a positive-displacement water pump. The water pump WP is installed on the drive shaft 3 (second drive shaft 32), and rotates together with the drive shaft 3.

The electric motor M1 includes a motor body M10 including a stator and a rotor, and a motor shaft M11 that functions as an output shaft to output the generated driving force (torque) to the outside.

The electric motor M1 is disposed on an extension of the central axis α of the propeller shaft P1. That is, the motor shaft M11 is disposed coaxially with the central axis α of the propeller shaft P1. The electric motor M1 is disposed below (immediately below) a steering shaft 12. The motor body M10 (electric motor M1) is disposed in a motor chamber 23 provided in the lower case 2. The motor chamber 23 is watertight due to a seal SL2 (see FIG. 3).

The propeller shaft P1 extends in the forward-rearward direction. The propeller P2 is attached to the rear end of the propeller shaft P1, and the propeller shaft P1 is rotated integrally with the propeller P2. The propeller shaft P1 is disposed in the lower case 2 and is disposed in an internal space chamber 22 positioned adjacent to a rear portion of the motor chamber 23. A rear portion of the internal space chamber 22 is open such that the internal space chamber 22 is able to house the propeller shaft P1, and the internal space chamber 22 extends in the forward-rearward direction along the central axis α of the propeller shaft P1. The motor chamber 23 that houses the electric motor M1 is disposed adjacent to a front portion of the internal space chamber 22. The motor driving force transmission M2 is housed at the front end of the internal space chamber 22. The internal space chamber 22 is partitioned from the adjacent motor chamber 23 by a partition wall K.

The motor driving force transmission M2 transmits the driving force of the electric motor M1 to the propeller shaft P1 when the drive state of the outboard motor 100 is the "motor drive state". The motor driving force transmission M2 is disposed between the propeller shaft P1 and the electric motor M1 in the forward-rearward direction. A slider S (slide shifter), which is described below, of the switch 4 is disposed between the motor driving force transmission M2 and the propeller shaft P1.

The motor driving force transmission M2 includes a planetary gear unit M20 rotated by the electric motor M1 (motor shaft M11) and an engaged portion M21 provided at the rear end of the planetary gear unit M20.

The engaged portion M21 engages with (meshes with) a motor clutch S3 of the slider S that moves in the forward-rearward direction at the time of shift switching, and rotates integrally with the motor clutch S3 (slider S). Thus, the propeller shaft P1 is rotated via the slider S. The slider S is a shaft that extends in the forward-rearward direction.

The cowling C (see FIG. 1) is disposed in the uppermost portion of the outboard motor 100. The cowling C houses the engine E (see FIG. 1) and an electric actuator (not shown) of the switch 4. Therefore, the upper end of the drive shaft 3 and the upper end of the shift shaft 4a are positioned inside the cowling C.

As shown in FIG. 2, the upper case 1 is disposed above the lower case 2 and below the cowling C. The upper case 1 includes a single member assembled to the front case 25 and the rear case 26 from above.

The lower end of the upper case 1 contacts both the entire upper end of the front case 25 and the entire upper end of the rear case 26 from above. A boundary (contact surface) between the upper case 1 and the lower case 2 (the front case 25 and the rear case 26) extends in the horizontal direction parallel or substantially parallel to the central axis α of the propeller shaft P1.

The lower case 2 houses the propeller shaft P1 and the electric motor M1. The lower end of the drive shaft 3 and the lower end of the shift shaft 4a are positioned inside the lower case 2. The lower case 2 is made of aluminum, for example, and is made by die-casting, for example.

The lower case 2 includes a streamlined torpedo-shaped portion 20 that extends in the forward-rearward direction, and an upper portion 21 connected to the torpedo-shaped portion 20 from above that is thin in the right-left direction. The torpedo-shaped portion 20 of the front case 25 includes an intake port 20a in the vicinity of the tip of the torpedo-shaped portion 20, and cooling water that flows into the water passage 27 is taken in via the intake port 20a.

As described above, the motor chamber 23 in which the motor body M10 is disposed (housed) and the internal space chamber 22 in which the propeller shaft P1, the bevel gear unit 5, and the motor driving force transmission M2 are disposed (housed) are provided in the lower case 2. A plurality of bearings br that directly or indirectly support the propeller shaft P1 are installed in the internal space chamber 22. The plurality of bearings br and a split surface 2a between the front case 25 and the rear case 26 are spaced apart from each other in the forward-rearward direction. That is, the split surface 2a is disposed forward of the plurality of bearings br.

As described above, the wiring chamber 24 is provided in the lower case 2. The wiring chamber 24 houses the end of the wiring H connected to the electric motor M1, and communicates with the motor chamber 23. The wiring chamber 24 is, for example, a substantially cylindrical space that extends upward from the upper end of the motor chamber 23.

The entire wiring chamber 24 overlaps the motor chamber 23 (electric motor M1) in the forward-rearward direction. Furthermore, the wiring chamber 24 is disposed at the rear portion of the motor chamber 23 (electric motor M1) in the forward-rearward direction.

The wiring room 24 is watertight. Specifically, the wiring chamber 24 includes a seal SL1 such that water in the water passage 27 does not enter the wiring chamber 24. The seal SL1 surrounds the periphery of the wiring H inside the water passage 27. The seal SL1 is attached to the inner surface of the water passage 27 with bolts, for example. The seal SL1 is disposed immediately above the wiring chamber 24.

The lower case 2 includes the front case 25 and the rear case 26, as described above.

The seal SL1 is disposed rearward of the split surface 2a between the front case 25 and the rear case 26.

The seal SL2 (see FIG. 3) that enhances the watertightness of the split surface 2a is provided on the split surface 2a separately from the seal SL1. The seal SL2 extends along the split surface 2a, and surrounds the motor chamber 23.

The split surface 2a and the wiring chamber 24 are spaced apart from each other in the forward-rearward direction. Specifically, the split surface 2a is positioned forward of the wiring chamber 24.

The split surface 2a extends in a direction perpendicular or substantially perpendicular to the forward-rearward direction. That is, the split surface 2a extends in a direction perpendicular or substantially perpendicular to the central axis α of the propeller shaft P1. Furthermore, the split surface 2a extends in a direction (e.g., vertical direction) perpendicular or substantially perpendicular to the horizontal direction.

The split surface 2a is positioned forward of the drive shaft 3.

Furthermore, the split surface 2a is positioned forward of the shift shaft 4a.

The split surface 2a is positioned forward of the front end of the propeller shaft P1. The split surface 2a is positioned in the vicinity of the steering shaft 12 in the forward-rearward direction.

The split surface 2a is positioned forward of the motor driving force transmission M2. That is, the split surface 2a is positioned forward of the internal space chamber 22. The split surface 2a is located at a position corresponding to the electric motor M1. That is, the split surface 2a is located at a position at which the motor chamber 23 is divided.

As described above, the lower case 2 (the front case 25 and the rear case 26) includes the water passage 27 through which the cooling water taken in via the intake port 20a and pumped by the water pump WP flows.

At least a portion of the water passage 27 provided in the lower case 2 (the front case 25 and the rear case 26) is disposed on the split surface 2a.

The water passage 27 provided in the front case 25 includes an inclined water passage 27a inclined with respect to the upward-downward direction at a position connected to the intake port 20a. The inclined water passage 27a is inclined such that a more rearward portion thereof is located at a more upward position. The inclined water passage 27a is disposed in a lower portion (e.g., a recess) inside the front case 25, and thus it is difficult to mold the inclined water passage 27a using a slider or a core, for example, at the time of die-casting (at the time of molding with a die). Therefore, the inclined water passage 27a is machined after die-casting. In the outboard motor 100 according to the first preferred embodiment, the lower case 2 is dividable into two portions, and a tool is insertable from the split surface 2a such that the machining is easily performed.

The split surface 2a extends over an entire area between the upper end 2b of the lower case 2 that contacts the upper case 1 and the lower end 2c of the torpedo-shaped portion (lower case 2).

Figure 3:
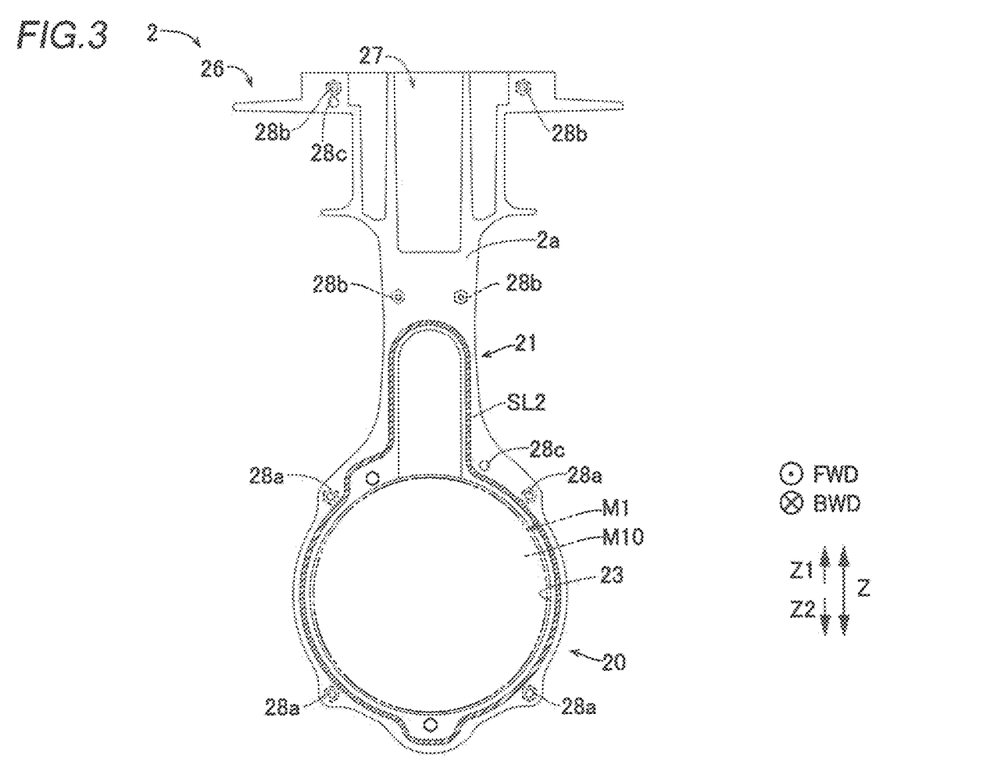
FIG. 3 is a diagram of a split surface of a lower case of the outboard motor according to the first preferred embodiment of the present invention, as viewed from the front side.

As shown in FIG. 3, the front case 25 (see FIG. 1) and the rear case 26 are assembled to each other with a plurality of (for example, four) first fasteners 28a disposed at intervals on the outer peripheral portion of the torpedo-shaped portion 20 (motor chamber 23). The first fasteners 28a include bolts and nuts, for example. The plurality of first fasteners 28a are disposed at equal or substantially equal angular intervals on the outer peripheral portion of the torpedo-shaped portion 20 (motor chamber 23). The first fasteners 28a are disposed outside the seal SL2. The first fasteners 28a are attached to the lower case 2 from the rear side toward the front side.

The front case 25 and the rear case 26 are assembled to each other with second fasteners 28b respectively provided in the vicinity of an intermediate position of the upper portion 21 and in the vicinity of the upper end of the upper portion 21 in the upward-downward direction. A pair of second fasteners 28b are provided in the right-left direction. The second fasteners 28b in the vicinity of the intermediate position of the upper portion 21 are attached to the lower case 2 from the front side toward the rear side. The first fasteners 28a in the vicinity of the upper end of the upper portion 21 are attached to the lower case 2 from the rear side to the front side.

The front case 25 and the rear case 26 include positioners 28c respectively provided at a substantially intermediate height and in the vicinity of the upper end in the upward-downward direction. The positioners 28c include pins, for example, fitted into the front case 25 and the rear case 26.

As shown in FIG. 2, the drive shaft 3 transmits the driving force of the engine E (see FIG. 1) to the propeller shaft P1 that rotates together with the propeller P2. Although not shown, the drive shaft 3 is disposed at an intermediate position of the outboard motor 100 in the right-left direction (the same applies to the shift shaft 4a and the propeller shaft P1).

An intermediate bevel gear 50 (a bevel gear disposed between a front bevel gear 51 and a rear bevel gear 52 in the forward-rearward direction), described below, of the bevel gear unit 5 is fixed to the lower end of the drive shaft 3.

The structure of the bevel gear unit 5 is now described with reference to FIG. 2.

The bevel gear unit 5 includes three gears including the intermediate bevel gear 50, the front bevel gear 51, and the rear bevel gear 52.

The intermediate bevel gear 50 constantly meshes (engages) with the front bevel gear 51 and the rear bevel gear 52. The intermediate bevel gear 50 is fixed to the lower end of the drive shaft 3. The front bevel gear 51 is disposed forward of the intermediate bevel gear 50. The rear bevel gear 52 is disposed rearward of the intermediate bevel gear 50.

The intermediate bevel gear 50 functions as a drive gear that drives the front bevel gear 51 and the rear bevel gear 52. That is, the front bevel gear 51 and the rear bevel gear 52 function as driven gears of the intermediate bevel gear 50. The front bevel gear 51 and the rear bevel gear 52 rotate about the central axis α of the propeller shaft P1. The rotation directions of the front bevel gear 51 and the rear bevel gear 52 are opposite to each other.

The switch 4 includes the shift shaft 4a that is disposed forward of the drive shaft 3 and switches the shift state of the outboard motor 100, the electric actuator (not shown) that rotates the shift shaft 4a (moves the slider S in the forward-rearward direction), and the slider S that moves in the forward-rearward direction as the shift shaft 4a rotates.

The switch 4 switches between three drive states including a "forward drive state", a "reverse drive state", and a "motor drive state" by moving the slider S in the forward-rearward direction.

In the "forward drive state" and the "reverse drive state", the engine E (see FIG. 1) rotates the propeller P2, and in the "motor drive state", the electric motor M1 rotates the propeller P2.

The slider S is a shaft disposed in the internal space chamber 22 and extends in the forward-rearward direction. The rear end of the slider S is connected to the propeller shaft P1 such that the slider S is movable in the forward-rearward direction with respect to the propeller shaft P1. The slider S moves forward when the shift shaft 4a rotates in a predetermined direction. Furthermore, the slider S moves rearward when the shift shaft 4a rotates in a direction opposite to the predetermined direction.

The slider S includes a connector S1 provided in the vicinity of the rear end of the slider S, drive clutches S2 provided at the rear end of the slider S, and the motor clutch S3 provided at the front end of the slider S.

The connector S1 connects the slider S to the propeller shaft P1. The connector S1 is a shaft that extends in a direction perpendicular to the forward-rearward direction. The connector S1 penetrates an elongated hole that extends in the forward-rearward direction of the propeller shaft P1.

The drive clutches S2 are provided at both ends of the connector S1. The drive clutches S2 are dog clutches, for example.

Figure 4:
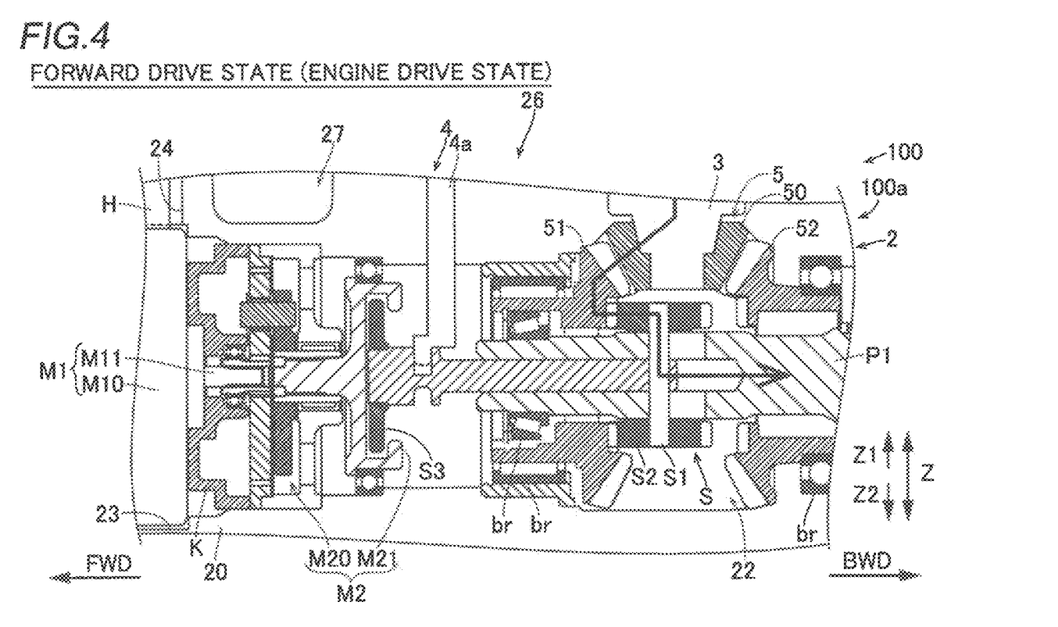
FIG. 4 is a partially enlarged view showing the inside of the lower case in a forward drive state by an engine of the outboard motor according to the first preferred embodiment of the present invention.

As shown in FIG. 4, when the slider S moves forward, the drive clutches S2 move forward together with the slider S and engage with the front bevel gear 51 from the rear side. Consequently, the drive state of the outboard motor 100 becomes the "forward drive state". In short, a driving force is transmitted from the drive shaft 3 to the propeller shaft P1 via a path that passes through the front bevel gear 51. In such a case, the motor clutch S3 does not engage with the engaged portion M21 of the planetary gear unit M20.

Figure 5:
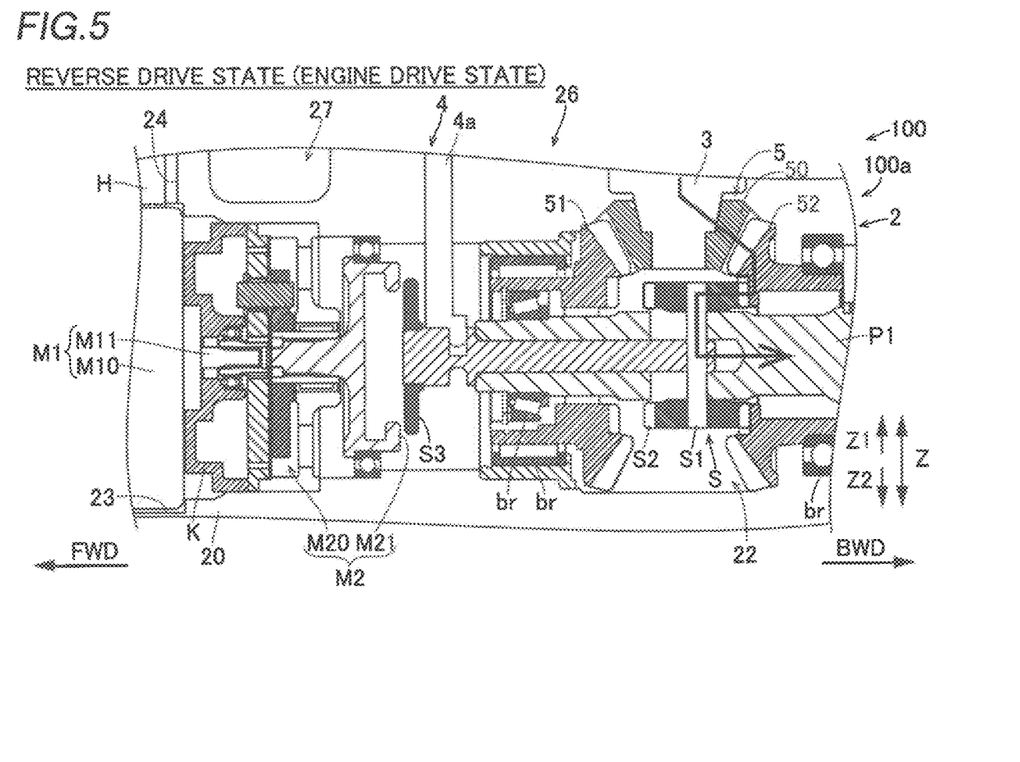
FIG. 5 is a partially enlarged view showing the inside of the lower case in a reverse drive state by the engine of the outboard motor according to the first preferred embodiment of the present invention.

As shown in FIG. 5, when the slider S moves rearward, the drive clutches S2 move rearward together with the slider S and engage with the rear bevel gear 52 from the front side. Consequently, the drive state of the outboard motor 100 becomes the "reverse drive state". In short, a driving force is transmitted from the drive shaft 3 to the propeller shaft P1 via a path that passes through the rear bevel gear 52. In such a case, the motor clutch S3 does not engage with the engaged portion M21 of the planetary gear unit M20.

Figure 6:
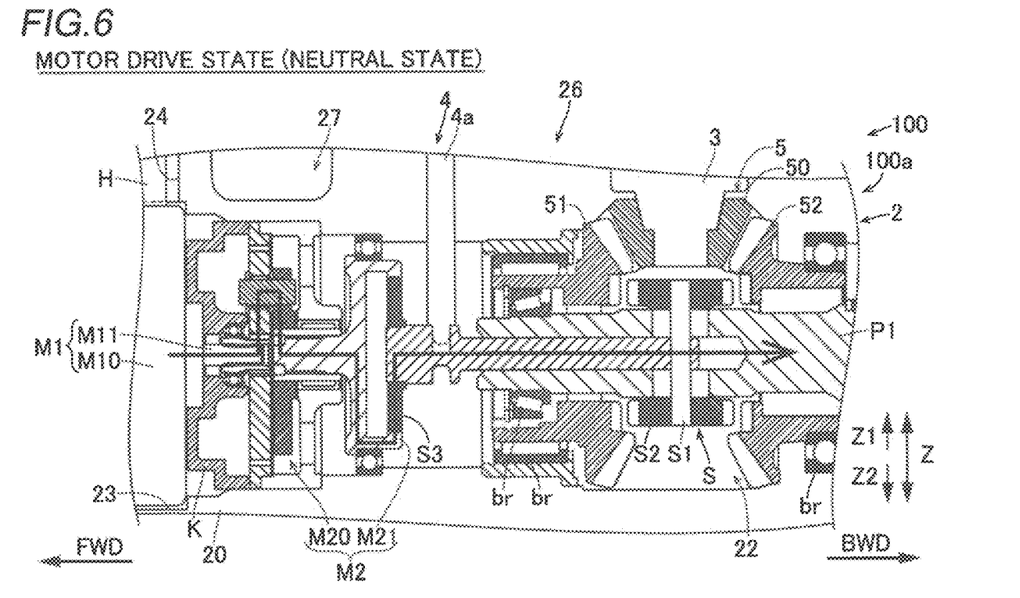
FIG. 6 is a partially enlarged view showing the inside of the lower case in a motor drive state by an electric motor of the outboard motor according to the first preferred embodiment of the present invention.

As shown in FIG. 6, the drive clutches S2 do not engage with either the front bevel gear 51 or the rear bevel gear 52 when the drive clutches S2 are located at intermediate positions (neutral positions) between positions at which the drive clutches S2 engage with the front bevel gear 51 and positions at which the drive clutches S2 engage with the rear bevel gear 52. In such a case, the motor clutch S3 engages with the engaged portion M21 provided at the rear end of the planetary gear unit M20. Consequently, the drive state of the outboard motor 100 becomes the "motor drive state". In short, a driving force is transmitted from the electric motor M1 to the propeller shaft P1 via a path that passes through the planetary gear unit M20.

A method (procedures) for assembling the lower case 2 is now described with reference to FIG. 2.

First, the bevel gear unit 5, the slider S, and the propeller shaft P1 are installed in the internal space chamber 22 of the rear case 26 in a state in which the front case 25 and the rear case 26 are separated. At this time, the bevel gear unit 5, the slider S, and the propeller shaft P1 are introduced from the rear side into the rear case 26. In the outboard motor 100, the bevel gear unit 5, the slider S, and the propeller shaft P1 may be introduced from the front side into the rear case 26.

Next, the motor driving force transmission M2 is installed in the internal space chamber 22 of the rear case 26 in a state in which the front case 25 and the rear case 26 are separated. At this time, the motor driving force transmission M2 is introduced from the front side (split surface 2a) into the rear case 26.

Then, the electric motor M1 is installed in the motor chamber 23 from the split surface 2a in a state in which the front case 25 and the rear case 26 are separated.

Finally, the front case 25 and the rear case 26 are assembled to each other with fasteners including the first fasteners 28a and the second fasteners 28b.

According to the first preferred embodiment of the present invention, the following advantageous effects are achieved.

According to the first preferred embodiment of the present invention, the lower case 2 includes the front case 25 and the rear case 26 separate from the front case 25 and disposed rearward of the front case 25, and the front case 25 and the rear case 25 are assembled to each other. Accordingly, unlike the conventional outboard motor in which the split surface extends in the forward-rearward direction over the entire lower case, in the outboard motor 100, the split surface 2a between the front case 25 and the rear case 26 is provided only in a portion of the lower case 2 in the forward-rearward direction. Therefore, unlike the conventional outboard motor, the split surface 2a (a portion in which a step or misalignment is likely to occur) is spaced apart from positions at which the bearings br of the propeller shaft P1 are installed in the lower case 2. That is, the bearings br are easily and accurately installed in the lower case 2 without being affected by the assembly accuracy of the front case 25 and the rear case 26 on the split surface 2a and the machining accuracy of the split surface 2a between the front case 25 and the rear case 26. Furthermore, the lower case 2 is divided into the front case 25 and the rear case 26, and thus internal components including the propeller shaft P1 are assembled also from the split surface 2a such that the workability of assembling the internal components including the propeller shaft P1 is improved. As described above, the bearings br that support the propeller shaft P1 are easily and accurately installed in the lower case 2, and the lower case 2 is divided such that the workability of assembling the internal components including the propeller shaft P1 is improved. In addition, the lower case 2 is divided into the front case 25 and the rear case 26 such that a tool such as a drill contacts the lower case 2 from the split surface 2a side (the side of the surface exposed for the first time by dividing), and a water passage and an oil passage, for example, are provided in the lower case 2 by machining. That is, the mechanical workability of the lower case 2 is improved.

According to the first preferred embodiment of the present invention, the split surface 2a between the front case 25 and the rear case 26 extends in the direction perpendicular or substantially perpendicular to the forward-rearward direction. Accordingly, in the outboard motor 100, the split surface 2a between the front case 25 and the rear case 26 is provided only in a very small area of the lower case 2 in the forward-rearward direction, and thus the split surface 2a is more easily spaced apart from the positions at which the bearings br of the propeller shaft P1 are installed as compared with a case in which the split surface 2a is largely inclined so as to extend along the forward-rearward direction. Consequently, the bearings br are more accurately installed in the lower case 2.

According to the first preferred embodiment of the present invention, the outboard motor 100 includes the drive shaft 3 to transmit the driving force of the engine E to the propeller shaft P1, and the split surface 2a between the front case 25 and the rear case 26 is positioned forward of the drive shaft 3. Accordingly, the split surface 2a is spaced forward from the position of the gear unit installed at the lower end of the drive shaft 3 in the forward-rearward direction, and thus the gear unit is accurately installed in the lower case 2.

According to the first preferred embodiment of the present invention, the outboard motor 100 further includes the shift shaft 4a that switches the shift state of the outboard motor 100, and the split surface 2a is positioned forward of the shift shaft 4a. Accordingly, the split surface 2a is spaced forward from the position of the slider S installed at the lower end of the shift shaft 4a in the forward-rearward direction, and thus the shift shaft 4a is accurately installed in the lower case 2.

According to the first preferred embodiment of the present invention, the split surface 2a between the front case 25 and the rear case 26 is positioned forward of the front end of the propeller shaft P1. Accordingly, the split surface 2a is spaced forward from the propeller shaft P1 in the forward-rearward direction, and thus the propeller shaft P1 is accurately installed in the lower case 2.

According to the first preferred embodiment of the present invention, the lower case 2 includes the internal space chamber 22 that includes the open rear portion so as to house the propeller shaft P1 and extends in the forward-rearward direction along the central axis α of the propeller shaft P1, and the split surface 2a between the front case 25 and the rear case 26 is positioned forward of the internal space chamber 22. Accordingly, various components housed in the internal space chamber 22 are accurately installed in the lower case 2.

According to the first preferred embodiment of the present invention, the outboard motor 100 further includes the electric motor M1 that is disposed on the extension of the central axis α of the propeller shaft P1 and rotates the propeller P2 instead of the engine E, the lower case 2 includes the motor chamber 23 that is disposed adjacent to the front portion of the internal space chamber 22 and houses the electric motor M1, and the split surface 2a is disposed at the position at which the motor chamber 23 is divided. Accordingly, the electric motor M1 is housed in the motor chamber 23 from the split surface 2a, and thus the electric motor M1 is easily installed in the lower case 2.

According to the first preferred embodiment of the present invention, the front case 25 includes the water passage 27 through which cooling water pumped by the water pump flows, the outboard motor 100 further includes the wiring H connected to the electric motor M1 via the water passage 27, and the lower case 2 includes the wiring chamber 24 that houses the end of the wiring H connected to the electric motor M1, communicates with the motor chamber 23, and is watertight, and the split surface 2a and the wiring chamber 24 are spaced apart from each other in the forward-rearward direction. Accordingly, the structure (seal SL1) that enhances the watertightness of the wiring chamber 24 and the structure (seal SL2) that enhances the watertightness of the split surface 2a are separately spaced apart without intersecting with each other, and thus complex shapes of the seals due to crossing of the structures are prevented.

According to the first preferred embodiment of the present invention, the outboard motor 100 further includes the electric motor M1 that is disposed on the extension of the central axis α of the propeller shaft P1 and rotates the propeller P2 instead of the engine E, and the motor driving force transmission M2 that is disposed between the electric motor M1 and the propeller shaft P1 and transmits the driving force of the electric motor M1 to the propeller shaft P1, and the split surface 2a is disposed forward of the motor driving force transmission M2 and at the position corresponding to the electric motor M1. Accordingly, the split surface 2a is spaced forward from the motor driving force transmission M2 including a plurality of gears and having a relatively complex shape, and the electric motor M1 is easily installed in the lower case 2 from the split surface 2a.

According to the first preferred embodiment of the present invention, the front case 25 includes the water passage 27 through which cooling water pumped by the water pump flows, and at least a portion of the water passage 27 provided in the front case 25 is disposed on the split surface 2a between the front case 25 and the rear case 26. Accordingly, the water passage 27, for example, is provided by inserting a drill or the like into the front case 25 from the split surface 2a. That is, the mechanical workability of the front case 25 is improved.

According to the first preferred embodiment of the present invention, the lower case 2 includes the streamlined torpedo-shaped portion 20, the front case 25 includes the intake port 20a disposed in the vicinity of the tip of the torpedo-shaped portion 20 and through which cooling water that flows into the water passage 27 is taken in, and the water passage 27 includes the inclined water passage 27a inclined with respect to the upward-downward direction. Accordingly, even the inclined water passage 27a, which is difficult to mold with a die and is inclined with respect to the upward-downward direction, is easily provided by machining from the split surface 2a after molding with a die.

According to the first preferred embodiment of the present invention, the lower case 2 includes the streamlined torpedo-shaped portion 20, and the front case 25 and the rear case 26 are assembled to each other with the plurality of first fasteners 28a disposed at intervals on the outer peripheral portion of the torpedo-shaped portion 20. Accordingly, the first fasteners 28a are disposed in a balanced manner on the outer peripheral portion of the torpedo-shaped portion 20, and thus the torpedo-shaped portion 20 is reliably kept watertight.

According to the first preferred embodiment of the present invention, the lower case 2 further includes the upper portion 21 connected to the torpedo-shaped portion 20 from above and which is thin in the right-left direction, and the front case 25 and the rear case 26 are assembled to each other with the second fasteners 28b provided in the vicinity of the intermediate position of the upper portion 21 of the lower case 2 and in the vicinity of the upper end of the upper portion 21 of the lower case 2 in the upward-downward direction. Accordingly, the second fasteners 28b are disposed in the upper portion 21 in a balanced manner in the upward-downward direction, and thus the entire split surface 2a (the torpedo-shaped portion 20 and the upper portion 21) is reliably kept watertight.

According to the first preferred embodiment of the present invention, the outboard motor 100 further includes the upper case 1 including a single member assembled to the front case 25 and the rear case 26 from above. Accordingly, the front case 25 and the rear case 26 are assembled to the same upper case 1, and thus the mutual positional accuracy of the front case 25 and the rear case 26 is improved as compared with a case in which the front case 25 and the rear case 26 are assembled to different structures.

According to the first preferred embodiment of the present invention, the lower case 2 includes the streamlined torpedo-shaped portion 20, and the split surface 2a between the front case 25 and the rear case 26 extends over the entire area between the upper end 2b of the lower case 2 that contacts the upper case 1 and the lower end 2c of the torpedo-shaped portion 20. Accordingly, as compared with the conventional outboard motor in which the split surface extends in the horizontal direction along the central axis of the propeller shaft, the split surface 2a is provided in a wider area in the upward-downward direction, and thus the mechanical workability of the upper portion 21 of the lower case 2 is improved.

Second Preferred Embodiment

Figure 7:
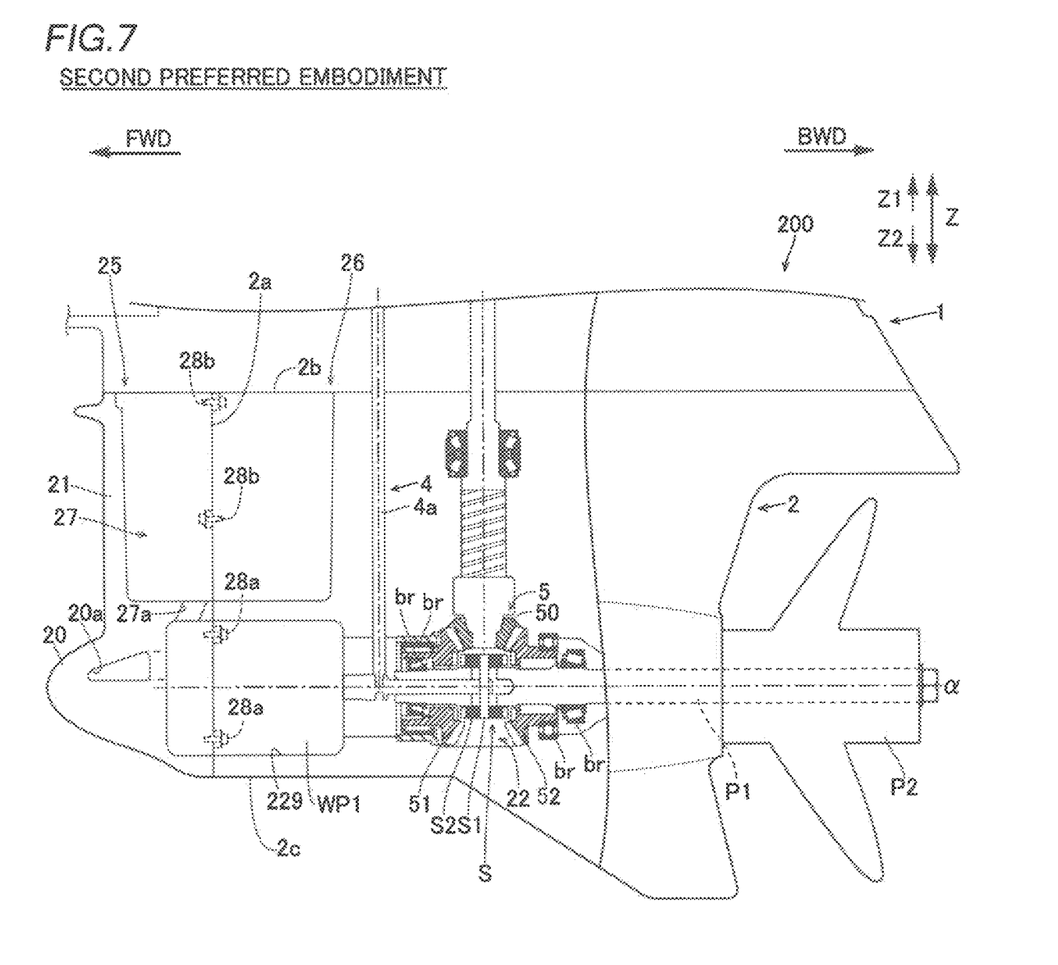
FIG. 7 is a partial sectional view showing the structure of an outboard motor according to a second preferred embodiment of the present invention.

The structure of an outboard motor 200 according to a second preferred embodiment of the present invention is now described with reference to FIG. 7. In the second preferred embodiment, a water pump WP1 is disposed on an extension of the central axis α of a propeller shaft P1, unlike the first preferred embodiment in which the electric motor M1 is disposed on the extension of the central axis α of the propeller shaft P1. In the second preferred embodiment, the same or similar structures as those of the first preferred embodiment are denoted by the same reference numerals, and description thereof is omitted.

The outboard motor 200 according to the second preferred embodiment includes the water pump WP1.

The lower case 2 includes a pump housing chamber 229 that houses the water pump WP1. The pump housing chamber 229 is disposed adjacent to a front portion of an internal space chamber 22. A split surface 2a is disposed at a position at which the pump housing chamber 229 is divided.

The water pump WP1 is preferably a non-positive displacement water pump driven by the propeller shaft P1 to pump seawater so as to cool an engine E (see FIG. 1). The water pump WP1 is disposed on the extension of the central axis α of the propeller shaft P1. Furthermore, the water pump WP1 is disposed below a steering shaft 12 (see FIG. 1).

The water pump WP1 is directly fixed to the front end of the propeller shaft P1, and is driven by the torque (driving force) of the propeller shaft P1.

According to the second preferred embodiment of the present invention, the following advantageous effects are achieved.

According to the second preferred embodiment of the present invention, similarly to the first preferred embodiment described above, bearings br that support the propeller shaft P1 are easily and accurately installed in a lower case 2, and the lower case 2 is divided such that the workability of assembling internal components including the propeller shaft P1 is improved.

According to the second preferred embodiment of the present invention, the outboard motor 200 includes the water pump WP1 driven by the propeller shaft P1 to pump cooling water, the lower case 2 includes the pump housing chamber 229 that is disposed adjacent to the front portion of the internal space chamber 22 and houses the water pump WP1, and the split surface 2a is disposed at the position at which the pump housing chamber 229 is divided. Accordingly, the water pump WP1 is housed in the pump housing chamber 229 from the split surface 2a, and thus the water pump WP1 is easily installed in the lower case 2.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the split surface between the front case and the rear case is preferably positioned forward of the shift shaft in each of the first and second preferred embodiments described above, the present invention is not restricted to this. In the present invention, the split surface between the front case and the rear case may alternatively be positioned rearward of the shift shaft.

While the split surface between the front case and the rear case is preferably positioned forward of the front end of the propeller shaft in each of the first and second preferred embodiments described above, the present invention is not restricted to this. In the present invention, the split surface between the front case and the rear case may alternatively be positioned rearward of the front end of the propeller shaft.

While the seal that keeps the wiring chamber watertight and the seal that is installed on the split surface and keeps the motor chamber watertight are preferably separately provided in each of the first and second preferred embodiments described above, the present invention is not restricted to this. In the present invention, the seal that keeps the wiring chamber watertight and the seal that is installed on the split surface and keeps the motor chamber watertight may alternatively be integral and unitary with each other.

While the split surface between the front case and the rear case preferably extends in the direction perpendicular or substantially perpendicular to the forward-rearward direction in each of the first and second preferred embodiments described above, the present invention is not restricted to this. In the present invention, the split surface between the front case and the rear case may alternatively be inclined with respect to the direction perpendicular or substantially perpendicular to the forward-rearward direction.

While the split surface between the front case and the rear case is preferably disposed at the position at which the motor chamber is divided in the first preferred embodiment described above, the present invention is not restricted to this. In the present invention, the split surface between the front case and the rear case may alternatively be spaced apart from the position at which the motor chamber is divided.

While the split surface between the front case and the rear case is preferably disposed at the position at which the pump housing chamber is divided in the second preferred embodiment described above, the present invention is not restricted to this. In the present invention, the split surface between the front case and the rear case may alternatively be spaced apart from the position at which the pump housing chamber is divided.

While components such as the electric motor and the water pump are preferably disposed forward on the extension of the central axis of the propeller shaft, respectively, in the first and second preferred embodiments described above, the present invention is not restricted to this. In the present invention, components such as the electric motor and the water pump may not be disposed forward on the extension of the central axis of the propeller shaft.

While when the slider moves forward such that the front bevel gear and the drive clutches of the slider mesh with each other, the marine vessel is preferably moved forward, and when the slider moves rearward such that the rear bevel gear and the drive clutches mesh with each other, the marine vessel is preferably moved rearward in each of the first and second preferred embodiments described above, the present invention is not restricted to this. In the present invention, when the slider moves forward such that the front bevel gear and the drive clutches mesh with each other, the marine vessel may alternatively be moved rearward, and when the slider moves rearward such that the rear bevel gear and the drive clutches mesh with each other, the marine vessel may alternatively be moved forward.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
    an engine:
    a propeller shaft that rotates together with a propeller and extends in a forward-rearward direction of the outboard motor;
    a lower case that houses the propeller shaft; and
    an upper case assembled to the lower case from above; wherein
    the lower case includes a front case and a rear case separate from the front case and positioned rearward of the front case;
    the front case and the rear case are assembled to each other; and
    a split surface between the front case and the rear case extends upwards over an entire area from a lower end of the lower case to an upper end of the lower case that contacts a lower end of the upper case.

2. The outboard motor according to claim 1, wherein the split surface between the front case and the rear case extends in a direction perpendicular or substantially perpendicular to the forward-rearward direction.

3. The outboard motor according to claim 1, further comprising:
    a drive shaft to transmit a driving force of the engine to the propeller shaft; wherein
    the split surface between the front case and the rear case is positioned forward of the drive shaft.

4. The outboard motor according to claim 3, further comprising:
    a shift shaft to switch a shift state of the outboard motor; wherein
    the split surface is positioned forward of the shift shaft.

5. The outboard motor according to claim 1, wherein the split surface between the front case and the rear case is positioned forward of a front end of the propeller shaft.

6. The outboard motor according to claim 1, wherein
    the lower case includes an internal space chamber that includes an open rear portion to house the propeller shaft and extends in the forward-rearward direction along a central axis of the propeller shaft; and
    the split surface between the front case and the rear case is positioned forward of the internal space chamber.

7. The outboard motor according to claim 6, further comprising:
    an electric motor on an extension of the central axis of the propeller shaft to rotate the propeller instead of the engine; wherein
    the lower case includes a motor chamber adjacent to a front portion of the internal space chamber to house the electric motor; and
    the split surface is at a position at which the motor chamber is divided.

8. The outboard motor according to claim 7, further comprising:
    a water pump to pump cooling water; wherein
    the front case includes a water passage through which the cooling water pumped by the water pump flows;
    the outboard motor further includes wiring connected to the electric motor via the water passage;
    the lower case includes a wiring chamber that houses an end of the wiring connected to the electric motor, communicates with the motor chamber, and is watertight; and
    the split surface and the wiring chamber are spaced apart from each other in the forward-rearward direction.

9. The outboard motor according to claim 6, further comprising:
    an electric motor on an extension of the central axis of the propeller shaft to rotate the propeller instead of the engine; and
    a motor driving force transmission between the electric motor and the propeller shaft to transmit a driving force of the electric motor to the propeller shaft; wherein
    the split surface is positioned forward of the motor driving force transmission and at a position corresponding to the electric motor.

10. The outboard motor according to claim 6, further comprising:
    a water pump driven by the propeller shaft to pump cooling water; wherein
    the lower case includes a pump housing chamber adjacent to a front portion of the internal space chamber to house the water pump; and
    the split surface is at a position at which the pump housing chamber is divided.

11. The outboard motor according to claim 1, further comprising:
    a water pump to pump cooling water; wherein
    the front case includes a water passage through which the cooling water pumped by the water pump flows; and
    at least a portion of the water passage provided in the front case is on the split surface between the front case and the rear case.

12. The outboard motor according to claim 11, wherein
    the lower case includes a streamlined torpedo-shaped portion;

the front case includes an intake port in a vicinity of a tip of the torpedo-shaped portion and through which cooling water that flows into the water passage is taken in; and the water passage includes an inclined water passage inclined with respect to an upward-downward direction of the outboard motor.

13. The outboard motor according to claim 1, wherein the lower case includes a streamlined torpedo-shaped portion; and the front case and the rear case are assembled to each other with a plurality of fasteners at an interval on an outer peripheral portion of the torpedo-shaped portion.

14. The outboard motor according to claim 12, wherein the lower case includes an upper portion connected to the torpedo-shaped portion from above; wherein the front case and the rear case are assembled to each other with a plurality of fasteners in a vicinity of an intermediate position of the upper portion of the lower case and in a vicinity of an upper end of the upper portion of the lower case in the upward-downward direction.

15. The outboard motor according to claim 1, wherein the upper case includes a single member assembled to the front case and the rear case from above.

16. The outboard motor according to claim 15, wherein the lower case includes a streamlined torpedo-shaped portion.

17. A marine vessel comprising:
a hull; and
an outboard motor mounted on the hull; wherein
the outboard motor includes:
an engine;
a propeller shaft that rotates together with a propeller and extends in a forward-rearward direction of the outboard motor;
a lower case that houses the propeller shaft; and
an upper case assembled to the lower case from above;
the lower case includes a front case and a rear case separate from the front case and positioned rearward of the front case;
the front case and the rear case are assembled to each other; and
a split surface between the front case and the rear case extends upwards over an entire area from a lower end of the lower case to an upper end of the lower case that contacts a lower end of the upper case.

18. The marine vessel according to claim 17, wherein the split surface between the front case and the rear case extends in a direction perpendicular or substantially perpendicular to the forward-rearward direction.

19. The marine vessel according to claim 17, further comprising:
a drive shaft to transmit a driving force of the engine to the propeller shaft; wherein
the split surface between the front case and the rear case is positioned forward of the drive shaft.

20. The marine vessel according to claim 19, wherein the outboard motor further includes a shift shaft to switch a shift state of the outboard motor; and
the split surface is positioned forward of the shift shaft.

* * * * *